June 24, 1958 M. CAMRAS 2,840,380

MAGNETIC RECORDER SOUND UNIT

Filed Jan. 23, 1952 2 Sheets-Sheet 1

Inventor:
Marvin Camras by Hill, Sherman, Meroni, Gross & Simpson Attys

Inventor:
Marvin Camras
by Hill, Sherman, Meroni, Gross & Simpson Attys

United States Patent Office 2,840,380
Patented June 24, 1958

2,840,380

MAGNETIC RECORDER SOUND UNIT

Marvin Camras, Chicago, Ill., assignor to Armour Research Foundation of Illinois Institute of Technology, Chicago, Ill., a corporation of Illinois Application January 23, 1952, Serial No. 267,815

5 Claims. (Cl. 274—4)

This invention relates to a magnetic recording sound unit and more particularly to a magnetic sound projector for motion pictures.

The use of a magnetic sound track on a moving picture film has been known for some time, and many suggestions have been made as to how it might be used in a motion picture projector so that the sound to accompany the moving picture might be reproduced from a magnetic sound track rather than from an optical sound track as is the common present day practice.

While many suggestions have been made, none of the known systems today have been as satisfactory as desirable from a commercial standpoint. One of the chief complications in using a magnetic sound track on motion picture film lies in the fact that the film tends to have irregularities occurring as a result of the presence of or formation of the sprocket holes in the film. It has been very difficult to maintain the recording head in conforming relation to the film at these irregularities and, consequently, it has been very difficult to obtain good quality of reproduction with any magnetic record made on a motion picture film.

One of the principal features and objects of the present invention is to provide a novel method and means for reproducing sound from a magnetic record made on motion picture film.

A further object of the present invention is to provide a novel magnetic recording and reproducing head and mounting therefor.

A further object of the present invention is to provide a novel magnetic sound projector.

Another and further object of the present invention is to provide a novel rotary stabilizing element for a magnetic sound projector. The present invention is a continuation-in-part of my copending application entitled "Magnetic Sound Apparatus," Serial No. 771,494 filed August 30, 1947, now U. S. Patent No. 2,654,809 issued October 6, 1953.

The novel features which I believe to be characteristic of my invention are set forth with particularity in the appended claims. My invention itself, however, both as to its organization, method of operation and manner of construction, together with further objects and advantages, may be understood by reference to the accompanying drawings, in which:

Figure 4 is a fragmentary elevational view similar to

Figures 1, 2:
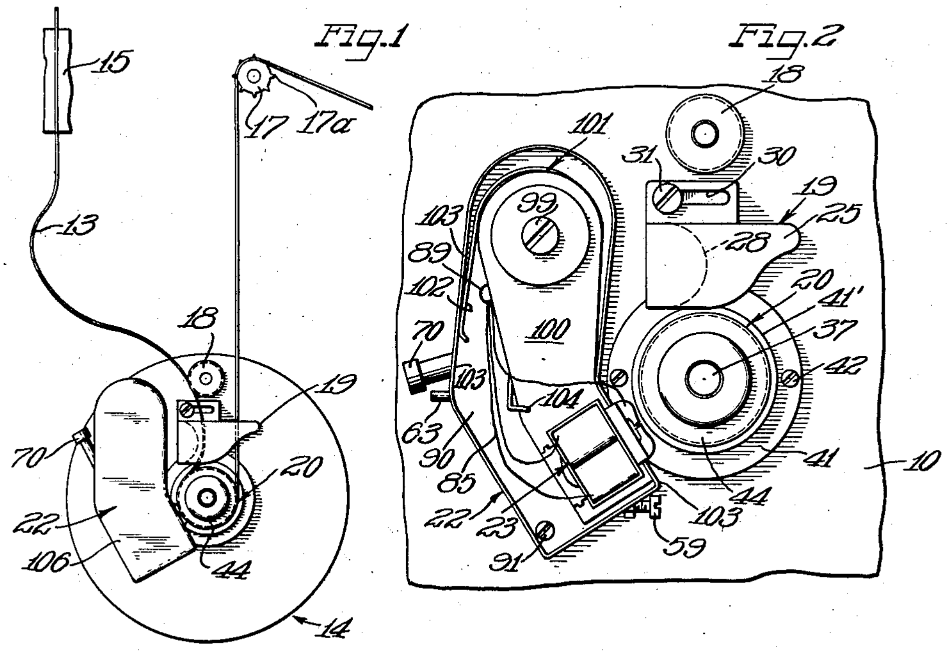
Figure 1 is a somewhat diagrammatic elevational view of a portion of a magnetic sound and motion picture projector which embodies certain of the novel principles and teachings of the present invention.
Figure 2 is an enlarged fragmentary elevational view of a portion of the projector of Figure 1, but with the cover plate of the head housing removed and showing the head assembly.
Figure 4:
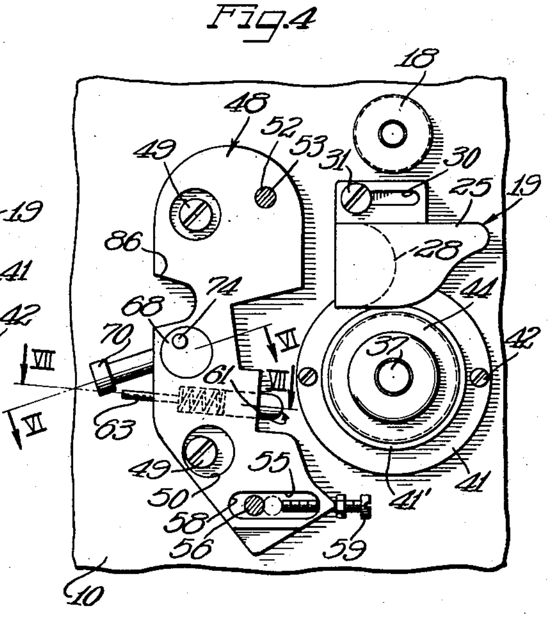
Figures 5, 6:
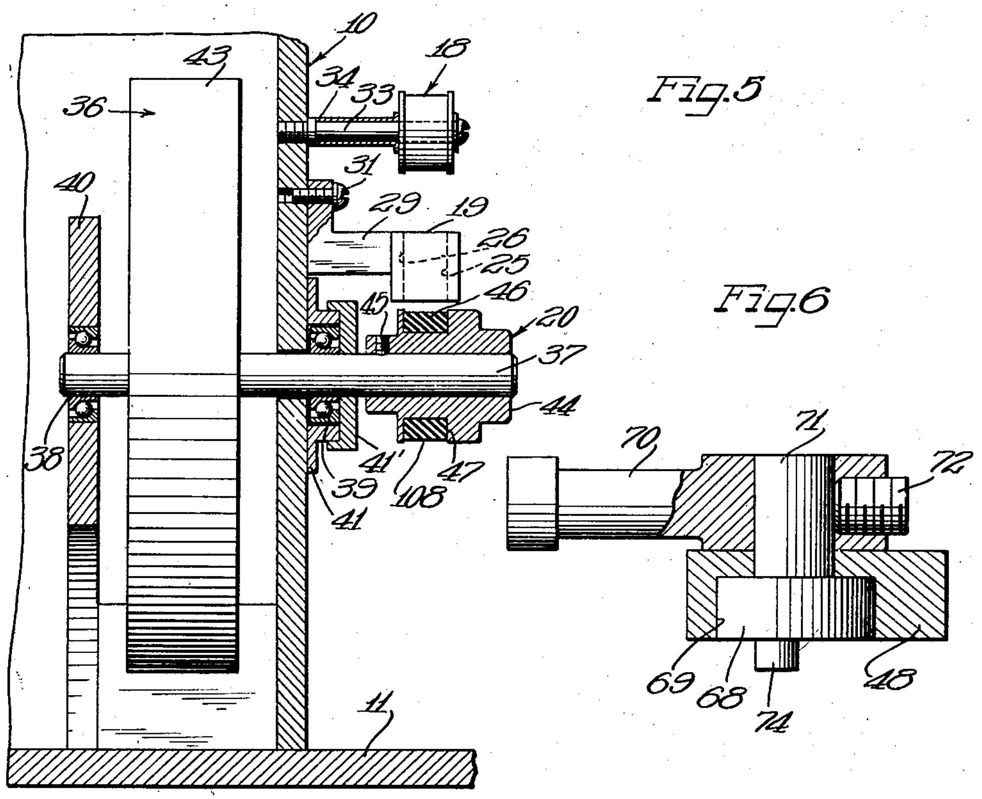
Figure 7:
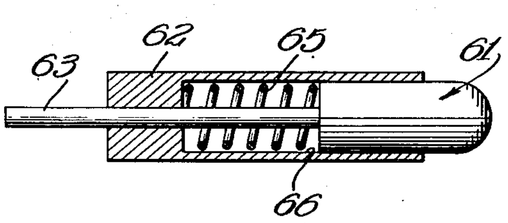

Figure 2, but with the head housing removed and showing the stationary mounting base therefor;

Figure 5 is an enlarged vertical transverse sectional view of a rotary stabilizing element according to the present invention;

Figure 6 is an enlarged fragmentary sectional view taken substantially along the line VI—VI of Figure 4; and Figure 7 is a fragmentary sectional view taken substantially along the line VII—VII of Figure 4.

The present invention relates primarily to the magnetic recording sound unit of a moving picture projector. It is immaterial in the present invention whether the sound projector is mounted in a separate housing or is carried in the same housing with the motion picture projector mechanism. The vertical wall 10 and base 11 shown in Figure 5 may therefore constitute part of a separate housing for the sound projector or may be a portion of a casing for both the sound unit and the motion picture projector.

The moving picture film 13, as shown in Figure 1, is delivered to the sound projector indicated generally by the reference numeral 14 through a conventional gate mechanism schematically illustrated at 15. The film is driven through the sound projector by means of the sprocket wheel 17 which has a plurality of projections or points **17*a* which engage in corresponding sprocket holes in the film 13**. It is particularly the irregularities in the film dimensions produced during the formation of these sprocket holes or resulting from the presence of the holes which give rise to the problems to be met by the present invention.

The film 13 extends between the roller 18 and the adjustable guide member 19 and passes around the rotary stabilizing element 20. The roller or stationary post 18 prevents the entering film from interfering with the film leaving the rotary stabilizing element. As seen in Figure 2, the housing 22 contains a magnetic recorder and reproducer head 23 which is adapted to cooperate with the magnetic sound track (not shown) on the back of the film 13 as the film passes around the rotary stabilizing element 20. The magnetic sound track is ordinarily carried on the photographic film between the edge of the motion picture film and the edge of the sprocket holes therein. A suitable type of head for use in the present invention is disclosed in my copending application entitled "Electromagnetic Transducer Head," Serial No. 229,618, filed June 2, 1951, now U. S. Patent No. 2,713,091, issued July 12, 1955.

As shown in Figure 5, the guide member 19 includes a pair of spaced plates 25 and 26 spaced approximately the width of the film by the curved plate 28 (Fig. 2). The guide member 19 is adjustably mounted on the wall 10 by means of the mounting bracket 29 having a slot 30 therein (Fig. 2) through which extends the clamping screw 31. The roller 18 is likewise mounted on the wall 10 by means of a mounting bolt 33 and spacer sleeve 34.

As also seen in Figure 5, the rotary stabilizing element 20 includes a flywheel assembly 36 which is mounted on a shaft 37. The shaft 37 is itself sustained in position by the bearings 38 and 39, which are carried in the wall 40 and in the support bracket 41 secured to the wall 10, respectively. As will be evident from Figure 2, the support bracket 41, which is closed by means of a cap 41', is held relative to the front wall 10 by screws 42. The housing 43 of the flywheel assembly 36 contains a massive rotor which is pivotally supported for rotation relative to the center of the shaft 37. A viscous damping fluid, such as oil, is contained within the housing 43 to cause the massive rotor to partake of the rotation of the housing 43.

The flywheel assembly 36 acts as a mechanical filter to sustain the rotation of the shaft 37 at a constant angular velocity despite variations in the torque applied thereto. As the shaft 37 is first rotated, the housing likewise rotates and the massive weight is accelerated by the viscous friction between the housing and the flywheel due to the presence of the oil damping fluid. When the flywheel is rotating at full speed, the massive weight rotates at substantially the same angular velocity as the housing 43. However, any torque applied to the shaft 37 tending to cause acceleration or deceleration thereof is resisted by the viscous friction between the housing 43 and the rotor, and thus the actual change in velocity imparted to the shaft 37 is reduced to a small value.

The rotary stabilizing element 20 also includes a capstan 44, the rotation of which is stabilized by the flywheel assembly 36 to tend to impart constant linear velocity to the film 13 as it passes around the capstan, the capstan 44 being secured to the shaft 37 by means of set screw 45. The purpose of the rubber ring 46 mounted within the recess 47 of the capstan will hereinafter be more fully described.

For mounting the head 23 and controlling its relation to the capstan 44 and the film passing therearound, the housing 22 is movably mounted on a stationary base 48 (Fig. 4). The stationary base 48 is mounted in spaced relation to the wall 10 by means of screws 49 whose heads are seated in counterbores 50 in the base. The base is provided with pivot hole 52 for pivotally receiving the housing pivot bolt 53. The base is further provided with a slot 55 for receiving the pin 56 of the housing for limited arcuate movement therein about the pivot bolt 53. The end wall 58 of the slot 55 limits the movement of the pin 56 away from the capstan 44 and an adjustable screw 59 limits movement of the pin 56 toward the capstan.

A spring finger 61 is reciprocably mounted in a cylinder 62 carried beneath the base plate 48. The finger 61, as shown in Figure 7, has a stem 63 extending axially therefrom and through the cylinder 62 to protrude from the rear of the base. A spring 65 is seated in a recess 66 of the cylinder and urges the finger 61 outwardly. The finger 61 is adapted to engage an abutment plate depending from the housing to urge the housing toward the capstan 44.

Figure 3:
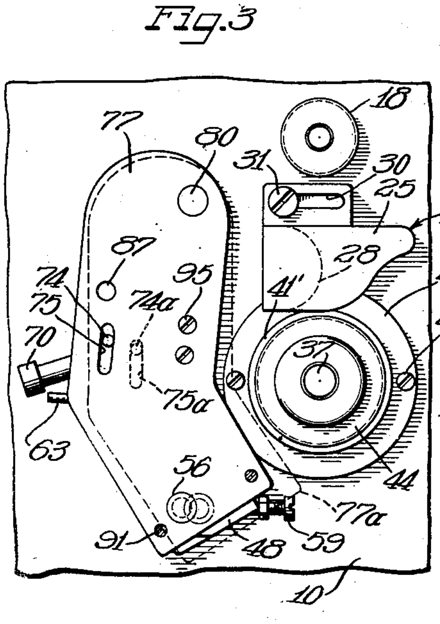
Figure 3 is a fragmentary elevational view similar to Figure 2, but with the housing upper plate removed and showing the housing bottom plate.

The stationary base 48 also has an eccentric control assembly for retracting the housing from its position adjacent the capstan 44 to which it is urged by the finger 61. The eccentric adjustment assembly comprises a disk 68 rotatably mounted in a cylindrical recess 69 in the base plate 48 (Figure 6). The rotation of the disk 68 is controlled by means of an arm 70 which, as seen in Figure 6, is attached to a shaft 71 depending from the disk 68 by means of a set screw 72. The disk 68 carries an eccentrically mounted pin 74 which cooperates with a slot 75 in the bottom plate 77 of the housing as seen in Figure 3. By shifting the arm 70 to the upper position as shown in Figure 1, the disk 68 is rotated to move the pin 74 to the dotted position indicated at **74*a* at the top of the slot 75*a* in Figure 3, the position of the bottom plate then being indicated in dotted outline at 77*a*** (Fig. 3).

In the position of the arm shown in Figures 2 to 4, the housing is effectively locked in its retracted position and the finger 61 is ineffective to move the housing toward the capstan 44. However, when the pin 74 is moved clockwise past a certain position, the finger 61 is then effective to control the position of the housing. The bottom plate 77 is provided with a hole 80 for receiving the bolt 53 therethrough.

For providing access of the wires 85 (Figure 2) to the head 23, the base plate 48 has a notch 86 therein and the bottom plate 77 has an opening 87 therethrough. As seen in Figure 2, a further opening 89 is provided in a second upper plate 90 of the housing which is secured to the bottom plate by means of screws 91. The screws 95 seen in Figure 3 serve to fasten the abutment plate for finger 61 beneath the bottom plate of the housing. The stem 63 of the finger 61 serves to retract the finger to the position shown in Figure 4 during assembly of the base plate 48.

As shown in Figure 2, the head 23 is mounted on an arm 100 which is pivotally mounted in the housing by means of a pivot bolt 99 which is spaced from the housing pivot bolt 53. The arm 100 is urged toward the capstan 44 by means of a wire spring 101 having one end 102 seated against a flange wall 103 of the housing upper plate 90, the other end 104 engaging the arm 100. The outward movement of the arm 100 relative to the housing is limited by the flange wall 103 of the plate 90. As shown in Figure 1, the housing 22 is provided with a top cover 106 which encloses all but the projecting confronting pole portions of the head 23.

In accordance with the present invention, the capstan 44 of the rotary stabilizing element is provided with a rubber or rubber-like surface 108 of the ring 46 (Figure 5) which is substantially the width of the film. The confronting pole portions of the head 23 are adapted to resiliently urge the film that travels around the capstan 44 against the rubber surface 108 which serves as a resilient cushion for conforming to irregularities on the front surface of the film and thereby minimizing the jarring forces exerted on the head 23 as a film travels therebetween. Thus the film must travel between a pair of resiliently opposed members, with the cushioning surface 108 tending to absorb irregularities in the film, to greatly improve the recording and reproducing qualities of the apparatus.

By virtue of the traction or high coefficient of friction inherent in the rubber surface 108 and the action of the head 23 in pressing against the back side of the film, a pinch roll or the like is unnecessary to insure driving of the capstan 44 by the film. A light roller may be used against the film just prior to where it passes under the head, if desired.

While I have shown a particular embodiment of my invention it will, of course, be understood that I do not wish to be limited thereto, since many modifications may be made and I therefore contemplate, by the appended claims, to cover all such modifications that fall within the true spirit and scope of my invention.

I claim as my invention:

1. In a magnetic sound apparatus, a rotary stabilizing element, a base mounted adjacent said rotary stabilizing element, an eccentric member rotatably mounted in said base, a housing pivotally mounted on said base and having a slot therein, a pin carried by said eccentric member eccentrically thereto and riding in said slot for locking said housing in a retracted position, a spring-urged finger carried by said base and engaging said housing to urge the housing toward said rotary stabilizing element, an arm pivotally mounted in said housing, a wire spring engaging said housing and said arm to urge said arm toward said rotary stabilizing element, means carried by said housing limiting movement of said arm, said housing substantially enclosing said arm, and an electromagnetic transducer head carried by said arm and projecting from said housing for cooperation with said rotary stabilizing element to reproduce sound from a sound track traveling therebetween.

2. A magnetic transducer head assembly comprising a base plate, a flat planar bottom plate overlying said base plate, first means pivotally connecting said base plate and said bottom plate, a flat planar arm overlying said bottom plate and disposed in parallel closely spaced relation thereto, second means spaced from said first means pivotally connecting said arm to said bottom plate, a transducer head rigidly carried by said arm for pivotal movement therewith, means urging said bottom plate to pivot in one direction relative to said base plate, means for limiting pivotal movement of said bottom plate in said one direction, and means urging said arm to pivot in said one direction relative to said bottom plate.

3. A magnetic transducer head assembly comprising a base plate having a circular recess therein, having a spring urged plunger carried thereby, and having an elongated slot, a bottom plate pivotally mounted on said base plate and having an elongated slot overlying said base plate recess, a disk journalled in said base plate recess and having an eccentrically disposed pin thereon projecting into the bottom plate elongated slot, said bottom plate having a pin projecting through said base plate elongated slot, means associated with said base plate elongated slot for adjustably limiting movement of said pin therein in one direction to limit pivotal movement of said bottom plate relative to said base plate in said one direction, said bottom plate having means engaging said spring urged plunger, said plunger urging said bottom plate to pivot in said one direction, means for rotating said disk operative to pivot said base plate in the opposite direction against the action of said spring urged plunger, an arm pivotally mounted on said bottom plate on an axis displaced from axis of pivotal movement of said bottom plate, spring means for urging said arm for pivotal movement in said one direction, means limiting pivotal movement of said arm relative to said bottom plate, and an electromagnetic transducer head rigidly mounted on said arm for pivotal movement therewith.

4. A self-contained magnetic transducer head assembly for attachment as a unit to a support, comprising a flat planar base plate having a spring urged plunger reciprocally carried thereby, a flat planar bottom plate pivotally mounted in spaced parallel relation to said base plate, said bottom plate having means engaging said spring urged plunger, said plunger urging said bottom plate to pivot in one direction, a flat planar arm pivotally mounted on said bottom plate in spaced parallel relation thereto, spring means for urging said arm for pivotal movement in said one direction, means limiting pivotal movement of said arm relative to said bottom plate, and an electromagnetic transducer head mounted on said arm for pivotal movement therewith.

5. A self-contained magnetic transducer head assembly for attachment as a unit to a support, comprising a flat planar base plate having a spring urged plunger reciprocally carried thereby, a flat planar bottom plate pivotally mounted in spaced parallel relation to said base plate, said bottom plate having means engaging said spring urged plunger, said plunger urging said bottom plate to pivot in one direction, a flat planar arm pivotally mounted on said bottom plate in spaced parallel relation thereto, spring means for urging said arm for pivotal movement in said one direction, means limiting pivotal movement of said arm relative to said bottom plate, an electromagnetic transducer head mounted on said arm for pivotal movement therewith, and a cover plate cooperating with said bottom plate to enclose said arm and a portion of the head carried thereby.

References Cited in the file of this patent

UNITED STATES PATENTS

| | | |
|---|---|---|
| 2,003,434 | Goldhammer | June 4, 1935 |
| 2,482,672 | Kiel | Sept. 20, 1949 |
| 2,518,556 | Kolb | Aug. 15, 1950 |
| 2,532,761 | De Blasio | Dec. 5, 1950 |
| 2,535,480 | Begun | Dec. 26, 1950 |
| 2,709,596 | Pettus | May 31, 1955 |

FOREIGN PATENTS

| | | |
|---|---|---|
| 899,195 | France | July 31, 1944 |